United States Patent [19]

Osada et al.

[11] Patent Number: 5,247,408
[45] Date of Patent: Sep. 21, 1993

[54] DISC CHUCKING APPARATUS

[75] Inventors: Yasuo Osada, Saitama; Fumio Horie, Tokyo, both of Japan

[73] Assignee: Sony Corporation, Tokyo, Japan

[21] Appl. No.: 716,637

[22] Filed: Jun. 17, 1991

[30] Foreign Application Priority Data

Jul. 31, 1990 [JP] Japan .................................. 2-203463

[51] Int. Cl.$^5$ ...................... G11B 5/012; G11B 17/22; G11B 23/00
[52] U.S. Cl. .................................. 360/98.06; 369/36; 369/195; 369/270
[58] Field of Search ............... 360/98.01, 98.04, 98.06, 360/98.08, 99.12; 369/36, 270, 183, 195

[56] References Cited

U.S. PATENT DOCUMENTS

| | | | |
|---|---|---|---|
| 2,453,123 | 11/1948 | Erwood | 369/183 |
| 4,782,473 | 11/1988 | Masaki | 369/34 |
| 4,903,252 | 2/1990 | Tanaka et al. | 369/36 |
| 5,014,143 | 5/1991 | Mori et al. | 360/99.12 |
| 5,048,005 | 9/1991 | Ekhoff | 369/270 |
| 5,056,082 | 10/1991 | Ekhoff | 369/270 |

FOREIGN PATENT DOCUMENTS

| | | | |
|---|---|---|---|
| 52-10703 | 1/1977 | Japan | 360/98.06 |
| 60-50741 | 3/1985 | Japan . | |

*Primary Examiner*—Stuart S. Levy
*Assistant Examiner*—Paul J. Ditmyer
*Attorney, Agent, or Firm*—Philip M. Shaw, Jr.

[57] ABSTRACT

A disc chucking apparatus for use in an automatic disc changer for a disc player includes an arm base 28 which is vertically movable and reversible with respect to a chassis 1, and a disc base 34 fixedly mounted on the arm member. The disc base 34 has a central insert member 34a for being inserted in the central hole of a disc and a disc support surface 34b for abutting engagement with a peripheral edge of the central hole of the disc. A rod 35 extends axially slidably through the central insert member 34a, and a pantographic link mechanism 38 is operatively coupled between the disc base 34 and an end of the rod 35, and collapsible and extensible in response to sliding movement of the rod 35. When the arm base 28 is vertically moved in response to sliding movement of the rod 35, with the presser assembly 38 extended, the central insert member 34a and the presser assembly 38 are inserted into the central hole of the disc. Thereafter, when the presser assembly 38 is collapsed in response to sliding movement of the rod 35 caused by the cam 32, the disc is clamped between the presser assembly 38 and the disc support surface 34b.

3 Claims, 9 Drawing Sheets

DISC CHUCKING APPARATUS

BACKGROUND OF THE INVENTION

1. Field of the Invention

The present invention relates to a disc chucking apparatus for chucking or clamping a disc such as a video disc, an audio disc, or the like, and loading the chucked disc into a recording and/or reproducing system.

2. Description of the Prior Art

Reproducing systems for video discs, audio discs, or the like, particularly those known as "karaoke" systems for playing back orchestral or instrumental accompaniments, comprise an automatic disc changer for storing a number of discs, taking out a desired one of the stored discs, and loading the disc into a reproducing mechanism.

One such automatic disc changer has a disc chucking apparatus including a pair of clamp members movable radially inwardly toward the disc for gripping the outer circumferential edge of the disc, and a disc support disposed inwardly of the lower ends of the clamp members for chucking or clamping thereon the disc chucked by the check members.

The disc chucking apparatus of another automatic disc changer comprises a chuck which has an insert member insertable into the central hole of a disc and an abutment support which will abut against the peripheral edge of the disc that defines the central hole thereof. The chuck also includes a presser attached to an upper circumferential surface of the insert member and extending parallel to the abutment support. In operation, the insert member is inserted in the central hole of the disc, and the abutment support is held against the peripheral edge of the central hole. Then, the presser is spread to grip the peripheral edge of the disc between the abutment support and the presser itself, thereby chucking the disc in place.

In the former disc chucking apparatus, since the disc is gripped at its outer circumferential edge, disc trays for housing and storing discs are required to have recesses for receiving the clamp members. Therefore, the discs stored in the disc trays may possibly be warped or otherwise distorted as the circumferential edges thereof are not firmly retained in their entirety. In addition, the disc trays are relatively complex in structure. Inasmuch as the clamp members are positioned radially outwardly of the discs, the disc chucking apparatus is large in size, and hence the automatic disc changer which incorporates the disc chucking apparatus is large in size and also expensive to manufacture.

The latter disc chucking apparatus is relatively small in size because the chuck clamps discs at their central holes. The insert member is inserted into the central hole of the disc from the lower side thereof, and the presser is pressed against the disc from the upper side thereof. If the insert member were inserted into the central hole from the upper side of the disc to chuck the same, the disc would be forcibly pressed against a disc tray on which the disc is supported, with the result that the recording surface of the disc would tend to be damaged. It is therefore not desirable to chuck the disc from the upper side thereof. Particularly, it is impossible to chuck the disc from a position that is relatively spaced from the upper side of the disc.

OBJECTS AND SUMMARY OF THE INVENTION

In view of the aforesaid shortcomings of the conventional disc chucking apparatus, it is an object of the present invention to provide a disc chucking apparatus which can chuck a disc at its central hole, from either an upper side or a lower side thereof, and from a position that is spaced from the disc.

According to the present invention, there is provided a disc chucking apparatus for clamping a disc having a central hole, comprising a chassis, an arm member which is vertically movable and reversible with respect to the chassis, a disc base fixedly mounted on said arm member and having a central insert member for being inserted in the central hole of the disc and a disc support surface for abutting engagement with a peripheral edge of the central hole of the disc, a rod extending axially slidably through the central insert member of the disc base, a cam disposed in the arm member, for axially sliding the rod, and a presser assembly operatively coupled between the disc base and an end of the rod, and collapsible and extensible in response to sliding movement of the rod. When the arm member is vertically moved in response to sliding movement of the rod, with the presser assembly extended, the central insert member and the presser assembly are inserted into the central hole of the disc, and thereafter when the presser assembly is collapsed in response to sliding movement of the rod caused by the cam, the disc is clamped between the presser assembly and the disc support surface.

When the rod is slid in a direction to project from the central insert member by the cam, the presser assembly is extended, and at the same time the arm member is vertically moved to cause the central insert member and the presser assembly into the central hole of the disc from one side of the disc. Thereafter, the rod is retracted into the central insert member by the cam. The presser member is collapsed, and abuts against and presses the peripheral edge of the central hole of the disc from the other side of the disc. Said one side of the disc is now held against the disc support surface of the disc base. Therefore, the disc is clamped at the peripheral edge of the central hole from the opposite sides thereof by the disc support surface and the collapsed presser assembly.

The disc thus clamped by the disc chucking apparatus is then loaded into a reproducing apparatus when the arm member is moved.

The disc can be clamped from either one of its opposite sides, i.e., from the upper side or the lower side thereof, while the disc is placed on its disc tray. Since the disc is clamped on the disc base through collapsing and extending movement of the presser assembly, the disc can be clamped in position even if the disc base is spaced from the disc.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 1:
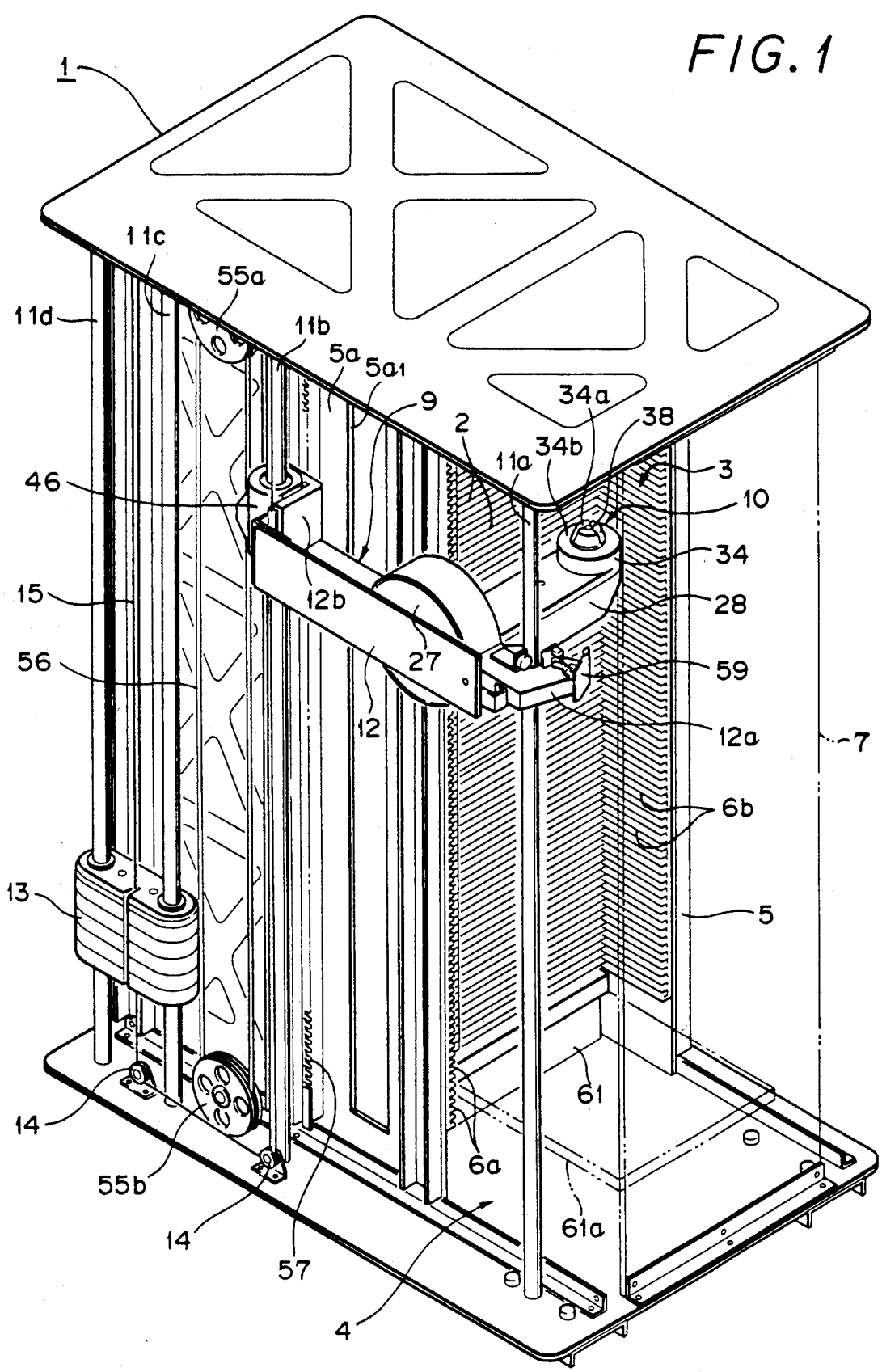
FIG. 1 is a perspective view of a disc loading apparatus which incorporates a disc chucking apparatus according to the present invention.

FIG. 1 shows a disc loading apparatus which incorporates a disc chucking apparatus according to the present invention. The disc loading apparatus has a three-dimensional chassis 1 which comprises a storage section 3 for storing a stack of disc trays 2 for supporting respective discs D (see FIG. 2) thereon, and a withdrawal section 4 contiguous to the storage section 3 for withdrawing a disc tray 2 from the storage section 3.

Figure 2:
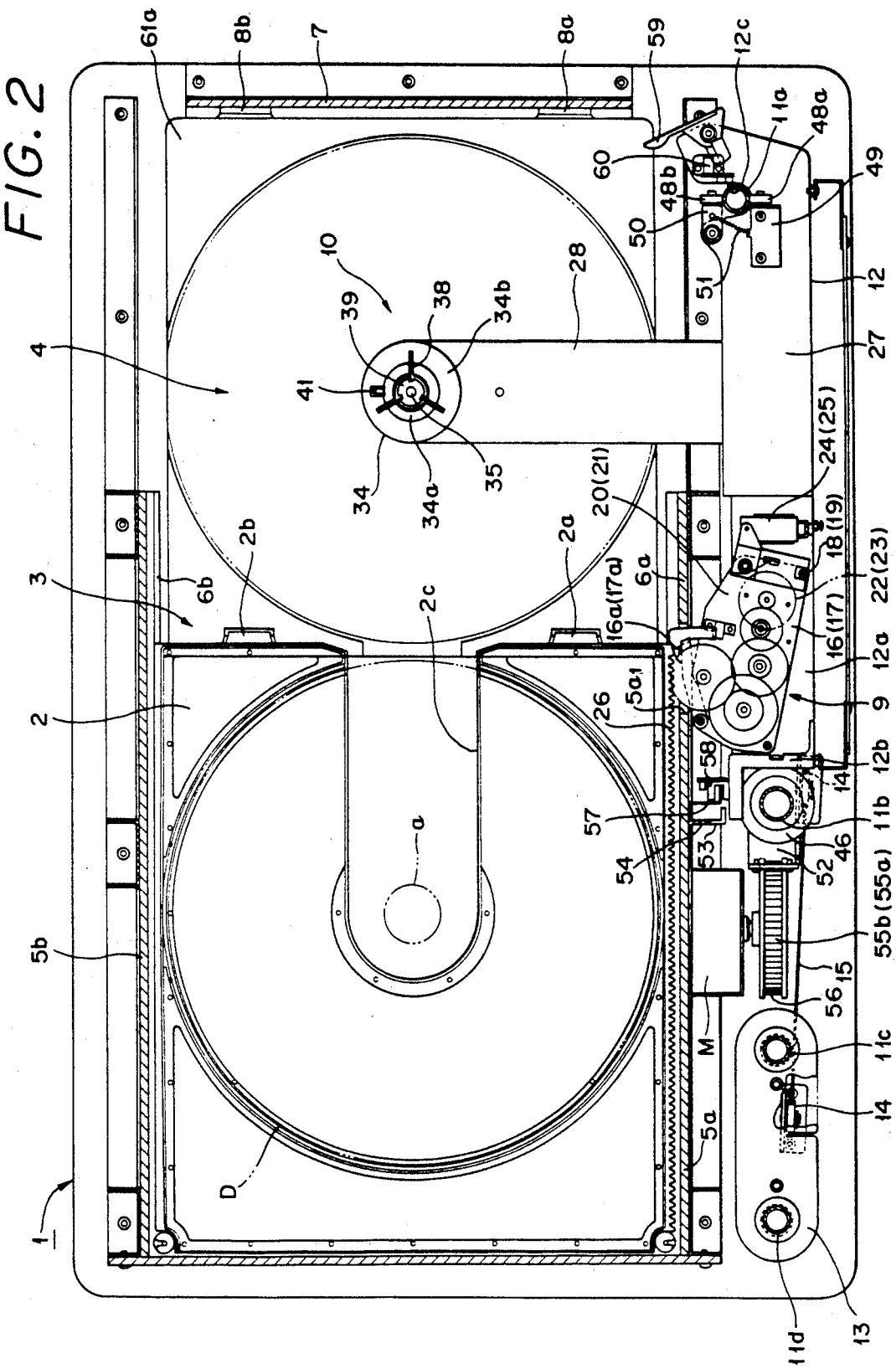
FIG. 2 is an enlarged horizontal cross-sectional view of the disc loading apparatus.
Figure 3:
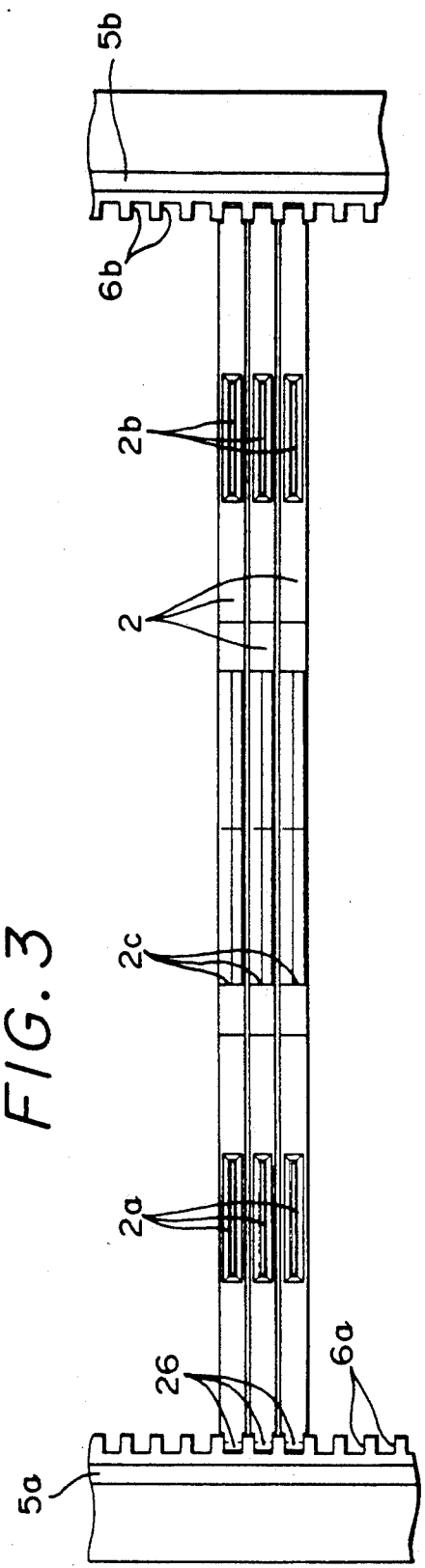
FIG. 3 is a front elevational view showing the manner in which disc trays are stored.
Figure 4:
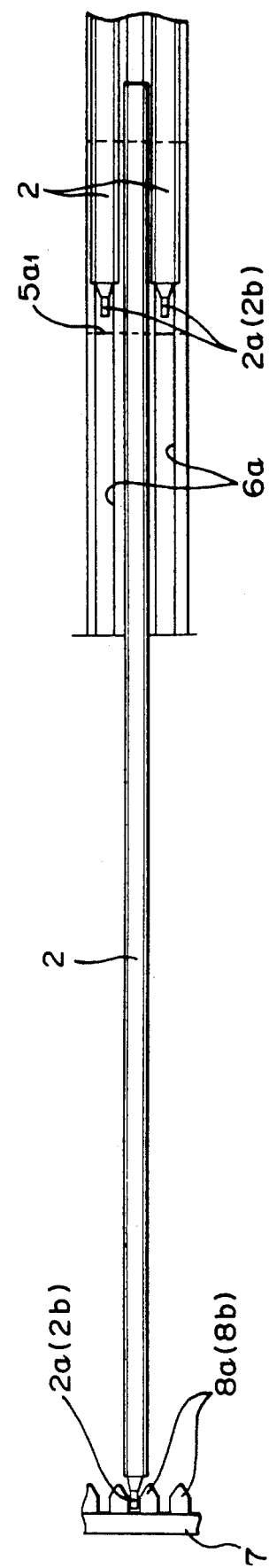
FIG. 4 is a side elevational view showing the manner in which a disc tray is withdrawn.

The chassis 1 includes opposite side walls 5a, 5b that extend from the storage section 3 into the withdrawal section 4, the side walls 5a, 5b having a width which is about one-third of the width of the withdrawal section 4. The side walls 5a, 5b have on their inner surfaces a number of horizontal slide guides 6a, 6b, respectively, which are vertically spaced at small intervals (see also FIGS. 3 and 4). The chassis 1 also has a front wall 7 disposed in the withdrawal section 4 opposite to the storage section 3. The front wall 7 has a number of vertically spaced support ridges 8a, 8b on its inner surface at respective side edge portions thereof, as shown in FIGS. 2 and 4. The support ridges 8a, 8b are horizontally aligned with the slide guides 6a, 6b.

The chassis 1 houses therein a moving mechanism 9 for moving the disc trays 2 which is positioned on one side of the storage section 3, i.e., outside of the side wall 5a, and a clamp or chuck mechanism 10 for clamping or chucking the discs D which is positioned within the withdrawal section 4.

More specifically, four vertical guide shafts 11a, 11b, 11c, 11d are disposed on one side of the chassis 1. An elevator 12 is vertically movably supported on the front guide shafts 11a, 11b which are spaced at a wider interval. A counterweight 13 is vertically slidably supported on the rear guide shafts 11c, 11d which are spaced at a smaller interval. The moving mechanism 9 and the chuck mechanism 10 are mounted on the elevator 12.

The elevator 12 and the counterweight 13 are connected to each other by a wire 15 trained around pulleys 14 attached to upper and lower panels of the chassis 12, so that the weights of the elevator 12 and the counterweight 13 are counterbalanced.

Figure 5:
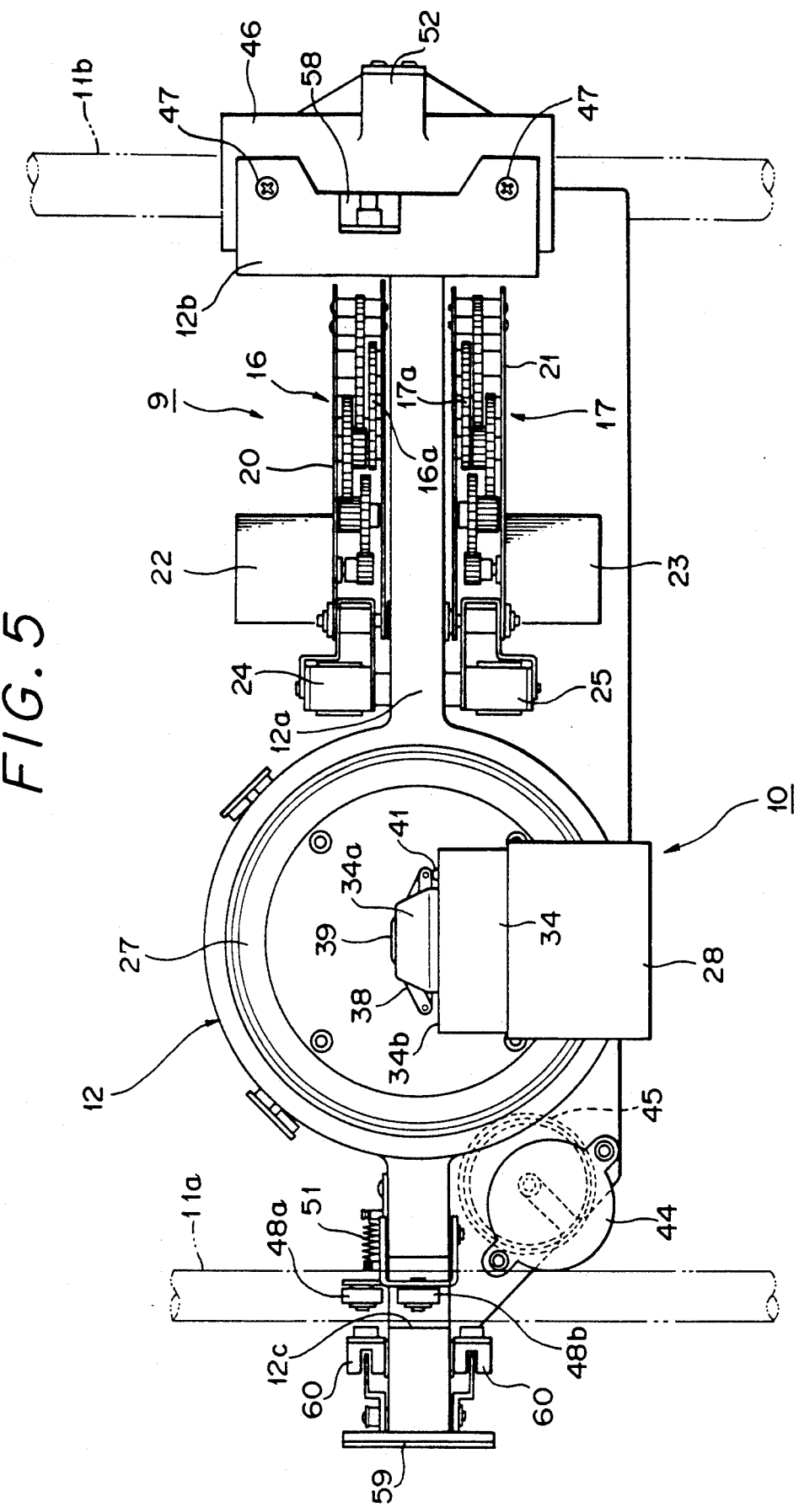
FIG. 5 is a side elevational view of a disc loading mechanism.
Figure 6:
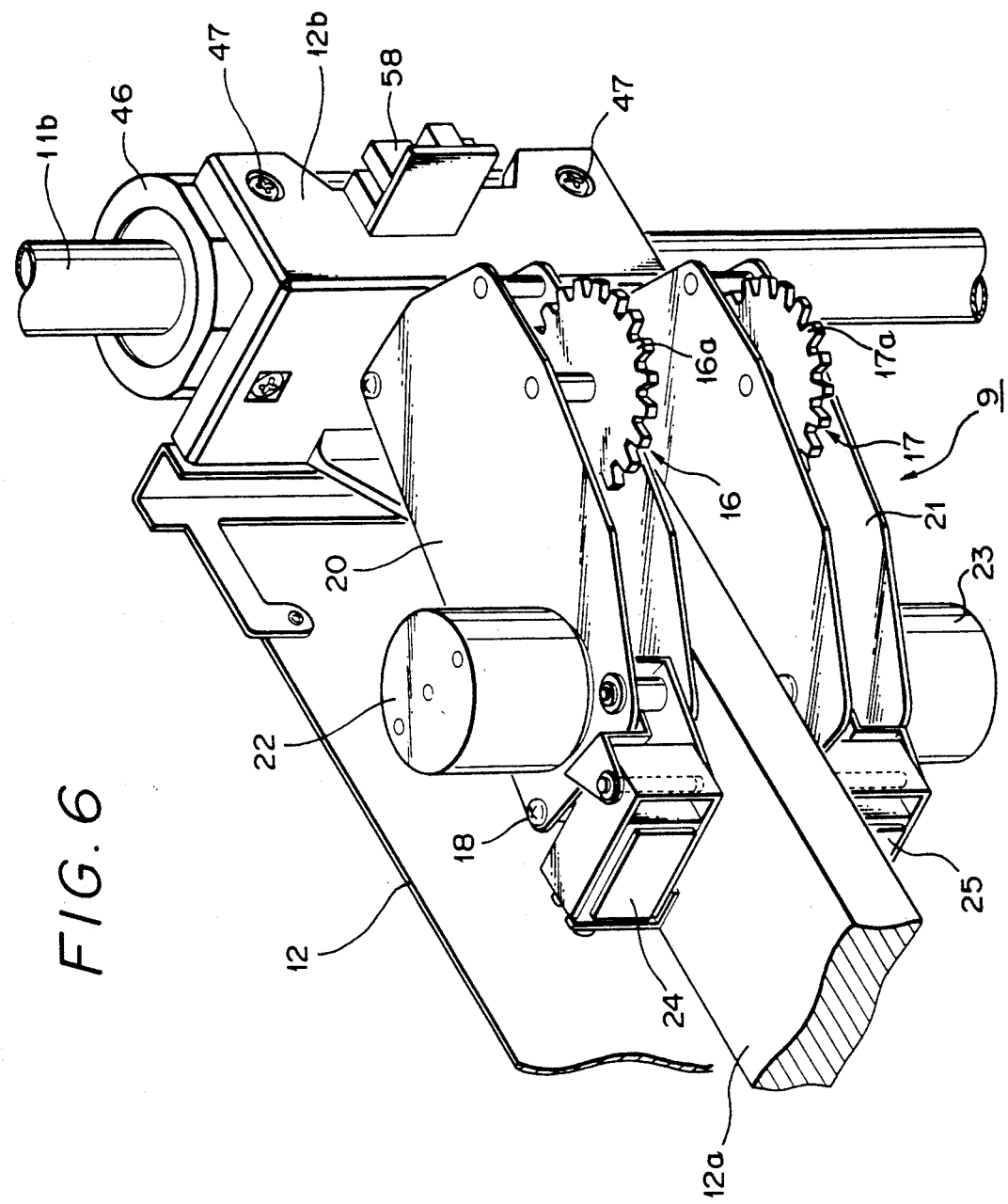
FIG. 6 is a perspective view of a disc tray moving mechanism.

The moving mechanism 9 comprises a pair of upper and lower moving members, i.e., first and second gear mechanisms 16, 17 (see FIGS. 2, 5, and 6). The first and second gear mechanisms 16, 17 are supported respectively in frame plates 20, 21 that are horizontally angularly movably mounted on upper and lower surfaces, respectively, of an elevator base 12a by respective pins 18, 19. The first and second gear mechanisms 16, 17 have respective final gears 16a, 17a partly projecting out from inner edges of the frame plates 20, 21. The first and second gear mechanisms 16, 17 can be driven by respective motors 22, 23 mounted on the respective frame plates 20, 21.

The frame plates 20, 21 are operatively coupled to plunger solenoids 24, 25, respectively, mounted on the elevator base 12a. When the plunger solenoids 24, 25 are energized to pull their plungers, the frame plates 20, 21 are turned inwardly about the pins 18, 19, i.e., in a direction toward the storage section 3, to displace portions of the final gears (hereinafter referred to as drive gears) 16a, 17a into the storage section 3 through a vertical hole 5a1 defined in the side wall 5a, into mesh with racks 26 on sides of selected disc trays 2 that are supported on slide guides 6a, 6b.

A rotary drum 27 is rotatably supported on a front end of the elevator 12 on the side of the withdrawal section 4. A horizontal arm base 28 is fixed to the rotary drum 27 at a position which is spaced a distance from the axis about which the rotary drum 27 is rotatable, the horizontal arm base 28 extending toward a central position in the withdrawal section 4. The chuck mechanism 10 is mounted on the distal end of the arm base 28 for alignment with the center of a withdrawn disc tray 2, i.e., the central hole d (FIG. 9) of a disc D on the withdrawn disc tray 2.

Figure 7:
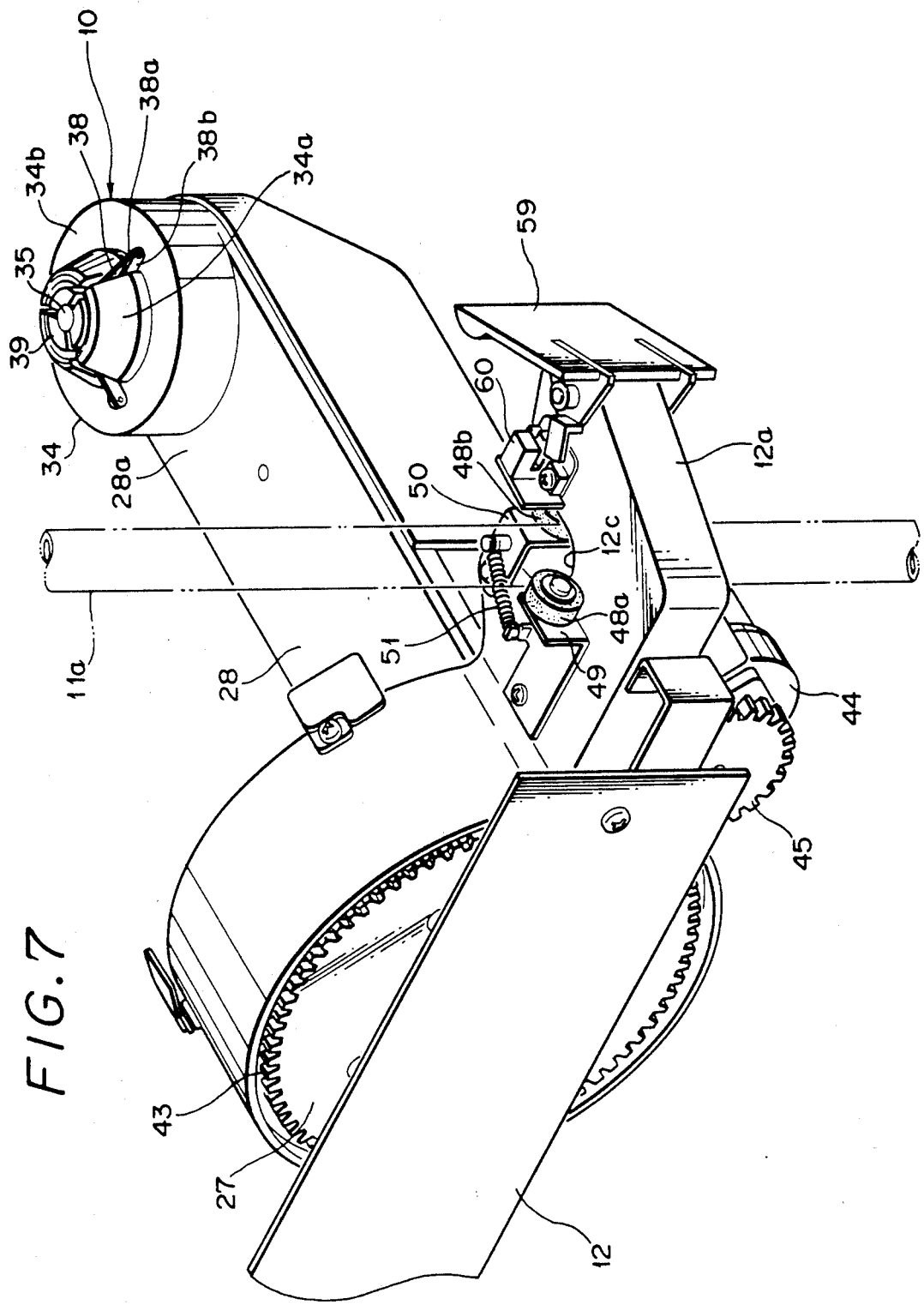
FIG. 7 is a perspective view of a chuck mechanism.
Figure 8:
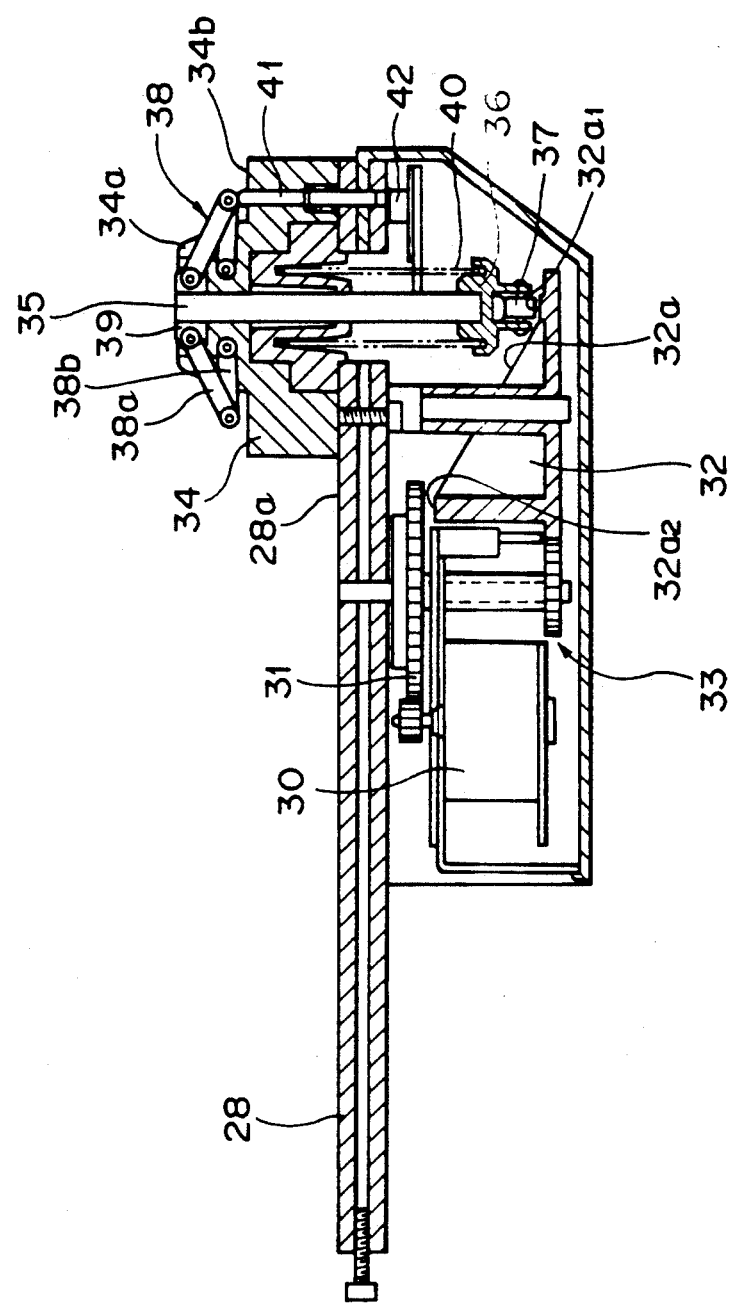
FIG. 8 is a cross-sectional view of the chuck mechanism.
Figure 9:
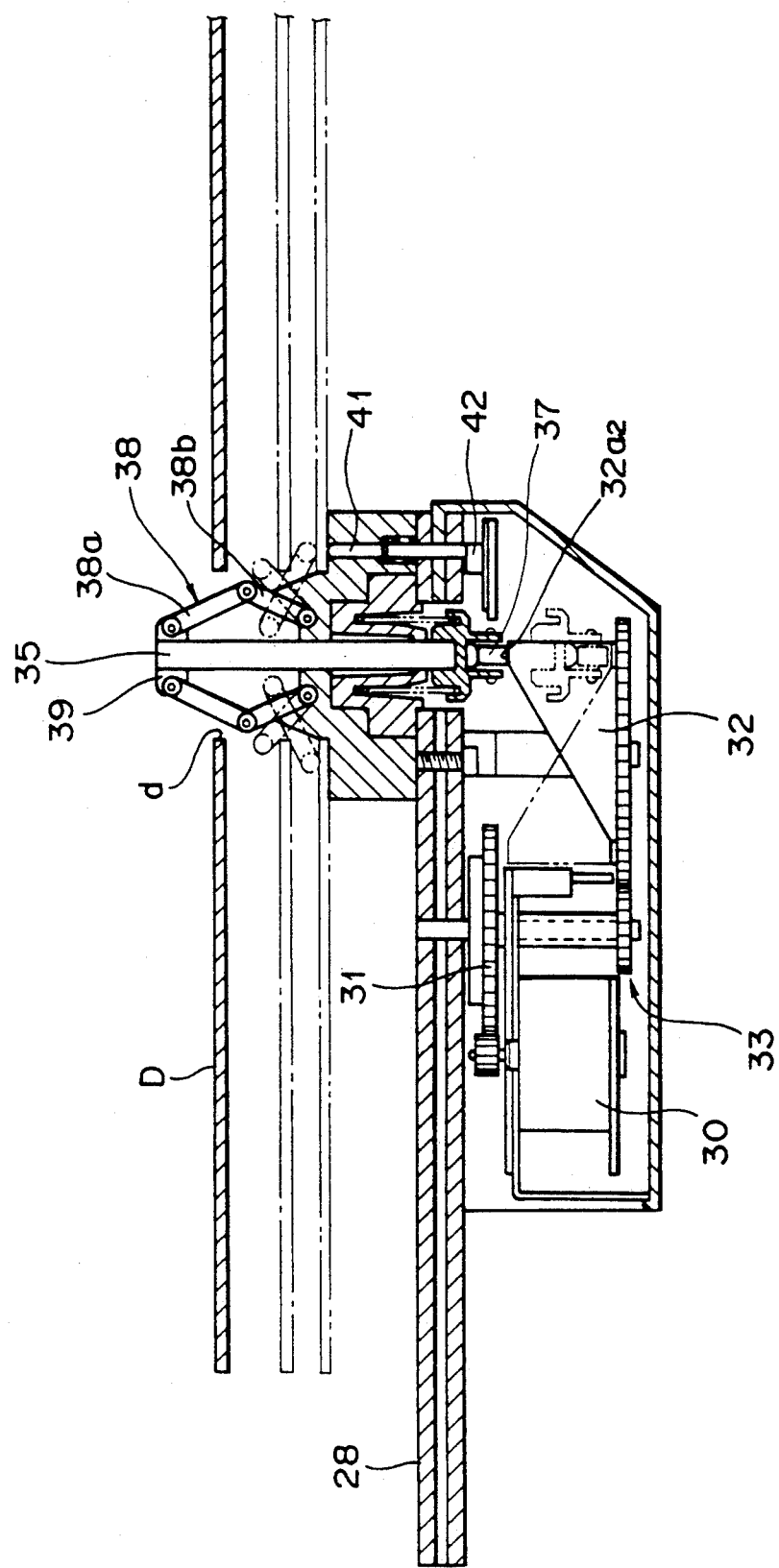
FIG. 9 is a cross-sectional view showing how the chuck mechanism operates.

As shown in FIGS. 7 through 9, the chuck mechanism 10 includes a drive mechanism 33 housed in the arm base 28 which comprises a motor 30, a speed reducer gear mechanism 31, and an end face cam 32. The chuck mechanism 10 also has a disc base 34 fixedly mounted on the upper surface of a distal end 28a of the arm base 28, and a rod 35 vertically slidably disposed in the center of the disc base 34. The rod 35 supports on its lower end a bracket 36 on which there is rotatably supported a roller 37 held in rolling contact with a cam surface 32a of the end face cam 32. The chuck mechanism 10 includes a pantographic chuck link mechanism 38, or a presser assembly, operatively coupled between the upper end of the rod 35 and the disc base 34.

The chuck link mechanism 38 comprises three angularly spaced sets of links, each composed of an upper link 38a and a lower link 38b which have certain lengths and are angularly movably joined to each other. Each upper link 38a has an upper end pivotally coupled to a holder 39 fixed to the upper end of the rod 35, and each lower link 38b has a lower end pivotally coupled toa central insert member 34a of the disc base 34. The rod 35 is normally urged to slide downwardly under the bias of a compression coil spring 40 which is interposed between the lower surface of the disc base 34 and the bracket 36 on the lower end of the rod 35, thereby pressing the roller 37 against the cam surface 32a of the end face cam 32.

When the rod 35 is in its lowermost position, i.e., when the roller 37 is pressed against a lowermost portion 32a1 of the cam surface 32a, the holder 39 on the upper end of the rod 39 is placed within the central insert member 34a of the disc base 34. At this time, the chuck link mechanism 38 is collapsed down, with the lower links 38b substantially parallel to, but spaced from, a disc support surface 34b of the disc base 34, for sandwiching and chucking a disc D between the lower links 38b and the disc support surface 34b, which abuts against the peripheral edge of the central hole d in the disc D.

The rotary drum 27 has an external gear 43 on its outer circumference which is held in mesh with a gear 45 (FIG. 7) of a geared motor 44 mounted on the elevator 12. When the geared motor 44 is energized, the rotary drum 27 is rotated through the gears 45, 43, turning the arm base 28 about the central axis of the rotary drum 27 to direct the chuck mechanism 10 either upwardly or downwardly.

The elevator 12 can be turned horizontally out of the chassis 1 about the guide shaft 11b on which the rear portion of the elevator 12 is supported through a bearing member 46 (see FIGS. 1, 2, and 5). At a certain vertical position, the elevator 12 can be dismounted from the chassis 1 when the elevator 12 is turned horizontally out of the chassis 1.

Figure 10:
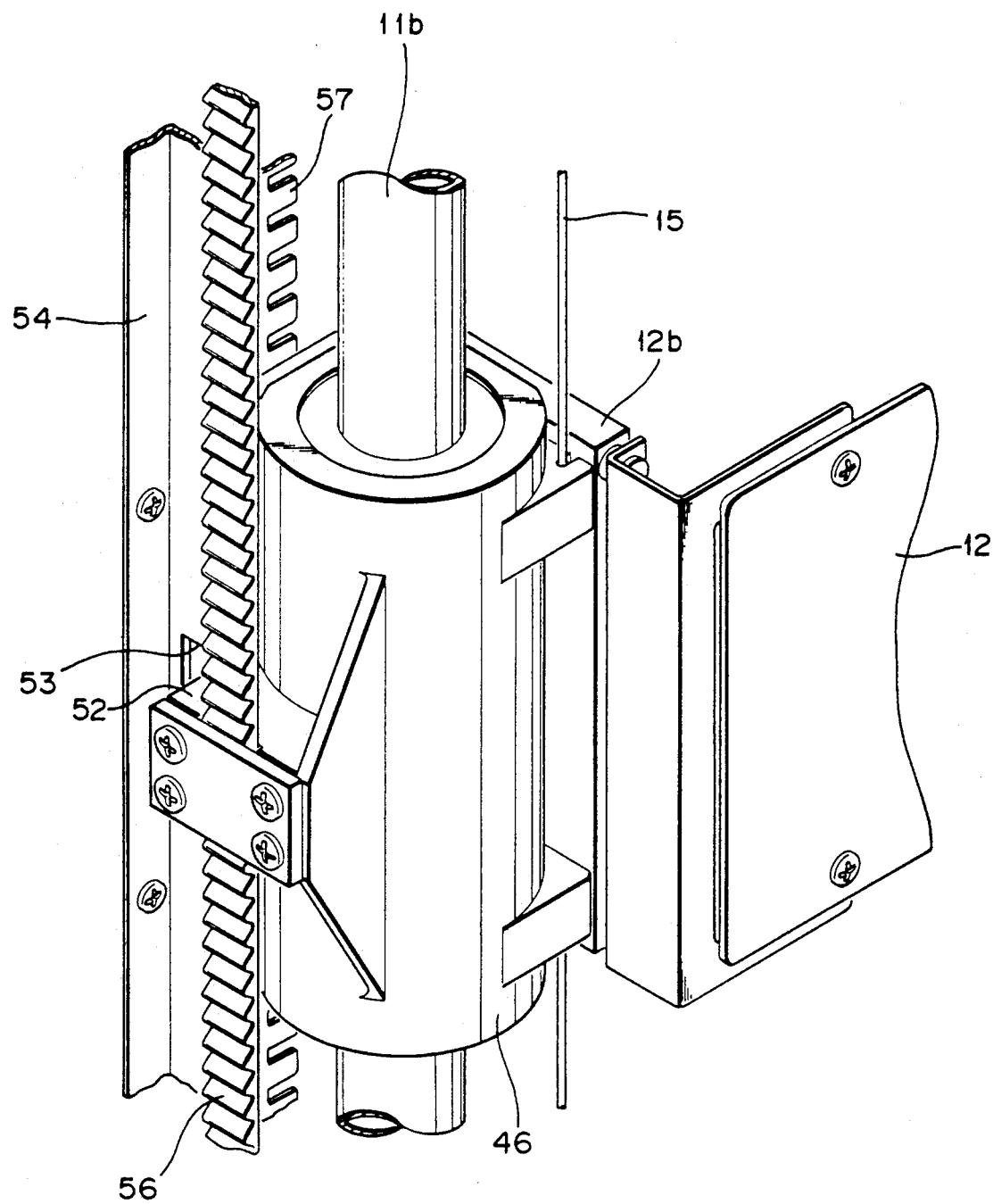
FIG. 10 is an enlarged fragmentary perspective view of a support for an elevator.

As shown in FIGS. 5, 6, and 10, the elevator 12 has on its rear end an angle attachment 12b which fits against an inner side of the bearing member 46 and is detachably fastened thereto by screws 47. The elevator 12 has a groove 12c (see FIGS. 5 and 7) defined in the front end of the elevator base 12a, for receiving the guide shaft 11a therein in a direction transverse to the axis thereof. The elevator base 12a supports guide rollers 48a, 48b for rollingly contacting and pressing the guide shaft 11a in sandwiching relation thereto when the guide shaft 11a is received in the groove 12c.

The guide roller 48a is rotatably supported on a bracket 49 which is fixedly mounted on the elevator base 12a, whereas the guide roller 48b is rotatably supported on an angularly movable bracket 50 that is pivotally mounted on the elevator base 12a. The angularly movable bracket 50 is normally biased by a tension spring 51 in a direction to force the guide roller 48b into rolling contact and pressing engagement with the guide shaft 11a against the roller 48a.

As shown in FIGS. 2, 5, and 10, the bearing member 46 has an engaging projection 52 disposed on a side thereof remote from the elevator 12. A reinforcing member 54 is attached to an outer surface of the side wall 5a and disposed near the guide shaft 11b (see FIGS. 2 and 10). The reinforcing member 54 has a recess 53 defined in its outer edge at a certain vertical position, e.g., substantially at its vertical center, for engaging the engaging projection 52 in a vertical direction when the bearing member 46 is turned, i.e., the elevator 12 is turned outwardly through about a right angle with respect to the side wall 5a.

Therefore, when the elevator 12 is horizontally turned outwardly about the guide shaft 12b at its substantially vertically central position until the elevator 12 lies substantially perpendicularly to the side wall 5a, the engaging projection 52 is engaged by the upper and lower edges of the recess 53 in the reinforcing member 54. The bearing member 46 is now prevented from sliding along the guide shaft 12b, so that the elevator 12 is prevented from being either lifted or lowered.

Even if the elevator 12 is detached from the bearing member 46 at this time, bringing the bearing 46 and the counterweight 13 out of balance, the counterweight 13 is prevented from falling by gravity because the engaging projection 52 is engaged by the upper and lower edges of the recess 53. Consequently, the bearing member 46 is prevented from moving and the counterweight 13 is prevented from falling at the time the elevator 12 is unfastened from the bearing member 46 for adjustment or repair of the moving mechanism 9 and the chuck mechanism 10.

To make the above safety arrangement more reliable, the region of the angle attachment 12b where the elevator 12 is fastened to the bearing member 46 by the screws 47 is exposed outwardly only when the elevator 12 is horizontally turned outwardly through about a right angle. Stated otherwise, unless the elevator 12 is horizontally turned outwardly through about a right angle, the elevator 12 cannot be detached from the bearing member 46. Accordingly, the bearing member 46 is prevented from moving and the counterweight 13 is prevented from falling highly reliably when the elevator 12 is unfastened.

For withdrawing a desired one of the discs D stacked in the storage section 3 of the chassis 1 in response to a disc selection signal, a motor M on the outer surface of the side wall 5a is energized to enable the bearing member 46 to lift or lower the elevator 12 along the guide shafts 11a, 11b.

More specifically, while the guide shaft 11a is being received in the groove 12c and the guide rollers 48a, 48b are being held in rolling contact with the guide shaft 11a, the bearing member 46 fitted over the guide shaft 11b is moved by a toothed belt 56 secured thereto and held in mesh with upper and lower toothed pulleys or sprockets 55a, 55b rotatably mounted on the chassis 1, one of the toothed pulleys 55a, 55b being coupled to the shaft of the motor M.

When the elevator 12 is lifted or lowered, the bearing member 46 moves along a position detecting bar 57 (FIGS. 2 and 10). At the time a predetermined position on the position detecting bar 57 is detected by a sensor 58 mounted on the angle attachment 12b, the motor M is de-energized in response to a detected signal from the sensor 58, bringing the elevator 12 to a stop. When the elevator 12 is stopped, one of the plunger solenoids 24, 25, e.g., the plunger solenoid 24, of the moving mechanism 9 of the elevator 12 is energized to pull the plunger thereof, turning one of the moving members, i.e., the first gear mechanism 16, to insert the drive gear 16a into the storage section 3 through the hole 5a1 in the side wall 5a. The drive gear 16a is now brought into mesh with the rack 26 of one of the disc trays 2 which are inserted between the slide guides 6a, 6b.

When the drive gear 16a of the first gear mechanism 16 meshes with the rack 26 of the disc tray 2, the first gear mechanism 16 is actuated by the motor 22 to rotate the drive gear 16a, thereby moving the disc tray 2 along the slide guides 6a, 6b into the withdrawal section 4. A detecting mechanism composed of an abutment plate 59 and a sensor 60 (see FIGS. 2, 5, and 7) on the tip end of the elevator base 12a detects when the movement of the disc tray 2 into the withdrawal section 4 is completed, i.e., when support tongues 2a, 2b on the front end of the disc tray 2 are engaged and supported by the support ridges 8a, 8b. In response to a detected signal from the detecting mechanism, the plunger solenoid 24 is de-energized to return the plunger, displacing the drive gear 16a of the first gear mechanism 16 out of mesh with the rack 26 of the disc tray 2 and out from the hole 5a1, whereupon the disc tray 2 is held at rest in the storage section 4.

At this time, the upper and links 38a, 38b of the chuck link mechanism 38 of the chuck mechanism 10 on the arm base 28 are extended upwardly by the rod 35 which is displaced upwardly by the roller 37 engaged by an uppermost portion 32a2 of the cam surface 32a of the end face cam 32.

The elevator 12 is then vertically moved, i.e., lifted in the illustrated embodiment, to lift the arm base 38. The upper and lower links 38a, 38b are inserted upwardly into the central hole d of the disc D until the upper surface of the disc base 34 on the arm base 28 abuts against the lower surface of the disc D on the disc tray 2.

Then, the motor 30 in the arm base 28 is energized to case the speed reducer gear mechanism 31 to turn the end face cam 32 to bring the lowermost portion 32a1 of the cam surface 32a below the rod 35. The rod 35 is lowered under the resiliency of the compression coil spring 40, collapsing the upper and lower links 38a, 38b downwardly. The lower links 38b are brought into abutment against the upper surface of the disc D, which is now clamped or chucked between the lower links 38b and the disc base 34.

Under this condition, the second moving member, i.e., the second gear mechanism 17, is horizontally aligned with the withdrawn disc tray 2. The second plunger solenoid 25 is energized to pull the plunger thereof, bringing the drive gear 17a of the second gear mechanism 17 into mesh with the rack 26 of the disc tray 2 in the storage section 4. The second gear mechanism 17 is actuated in the reverse direction to return the disc tray 2 from the withdrawal section 4 back into the storage section 3, leaving the disc D chucked by the chuck mechanism 10 and placed in the withdrawal section 4.

Thereafter, the rotary drum 27 is rotated by the geared motor 44 to reverse the arm base 2 until the chuck mechanism 10 which holds the disc D faces a reproducing device 61 that is disposed in a lower portion of the chassis 1. More specifically, the disc D clamped by the chuck mechanism 10 confronts a tray 61a of the reproducing device 61 which has been pulled into a lower portion of the withdrawal section 4.

At this time, the plunger solenoid 25 operatively coupled to the second gear mechanism 17 has been de-energized, displacing the drive gear 17a out mesh with the rack 26 of the disc tray 2 and out from the hole 5a1.

The elevator 12 is then lowered by the motor M until the disc D clamped by the chuck mechanism 10 is about to abut against the pulled tray 61a of reproducing device 61, whereupon the elevator 12 stops being lowered. When the elevator 12 stops being lowered, the chuck link mechanism 38 is actuated, i.e., the end face cam 32 is turned by the motor 30 to enable the uppermost portion 32a2 thereof to push the rod 35 upwardly against the bias of the spring 40. The upper and lower links 38a, 38b are extended upwardly and contracted horizontally to a size smaller than the central hole d of the disc D. The disc D is now released from the chucked condition, and drops onto the tray 61a of the reproducing device 61.

Subsequently, the elevator 12 is lifted to a given position, i.e., a position where the chuck mechanism 10 is spaced from the disc D on the tray 61a, and is then stopped. The tray 61a on which the disc D is supported is then pulled into the reproducing device 61, in which the disc D is played back. The elevator 12 stays in the stopped position until the disc D is discharged from the reproducing device 61.

When the disc D on the tray 61a is discharged from the reproducing device 61, the elevator 12 is lowered again to insert the chuck link mechanism 38 into the central hole d in the disc D. The upper and lower links 38a, 38b are then folded by the end face cam 32 against the force of the compression coil spring 40, chucking the disc D.

With the disc D thus clamped by the chuck mechanism 10, the elevator 12 moves up to a position that is horizontally aligned with the empty disc tray 2 from which the disc D has been removed. The second gear mechanism 17 is now held in horizontal alignment with the side of the empty disc tray 2 in the storage section 3 through the hole 5a1 in the side wall 5a.

The plunger solenoid 25 is now energized to pull the plunger thereof to insert the drive gear 17a through the hole 5a1 into mesh with the rack 26 of the empty disc tray 2. The motor 23 is energized to rotate the drive gear 17a, drawing the empty disc tray 2 into the withdrawal section 2. The empty disc tray 2 is now positioned beneath the disc D clamped by the chuck link mechanism 38. More specifically, if the chuck mechanism 10 as it faces downwardly clamps the disc D, then the empty disc tray 2 is drawn into a position below the disc D and also the arm base 28. If the chuck mechanism 10 which clamps the disc D is reversed and faces upwardly, then the empty disc tray 2 is drawn into a position below the disc D, but above the arm base 28, with the disc base 34 positioned in a central open slot 2c defined in the empty disc tray 2.

When the empty disc tray 2 is drawn and stopped below the chucked disc D, the chuck link mechanism 38 is actuated by the end face cam 32 to extend the upper and lower links 38a, 38b, thus releasing the disc D. If the chuck mechanism 10 faces downwardly toward the empty disc tray 2, then the disc D drops onto the empty disc tray 2 due to gravity. If the chuck mechanism 10 faces upwardly with the empty disc tray 2 between the arm base 28 and the disc D on the disc base 34, then the elevator 12 is descends, leaving the disc D from the disc base 34 on the empty disc tray 2. The upper and lower links 38a, 38b of the chuck link mechanism 38 are now downwardly displaced out of the central hole d in the disc D.

After the disc D has been placed on the empty disc tray 2, the disc tray 2 is moved backwards into the storage section 3 by the rack 26 meshing with the drive gear 17a that is reversed by the motor 23, and stores the disc D in the storage section 3.

In this manner, a desired disc D is withdrawn from the stack of discs D in the storage section 3, transferred to and set in the reproducing device 61, played back, and then returned to the storage section 3. One cycle of disc playback operation is thus completed.

When a next disc selection signal is applied, the elevator 12 is lifted or lowered to the position of a desired disc D, withdraws the disc D, and transfers the disc D to the reproducing device 61. After the disc D is played back by the reproducing device 61, the disc D is returned to the storage section.

To play back the reverse side of a double-sided disc D with recording surfaces on its opposite sides, i.e., the side of the disc D which faces the disc tray 2 that supports the disc, the chuck mechanism 10 is reversed so that the chuck link mechanism 38 faces downwardly toward the upper surface of the disc tray 2, before the disc tray 2 supporting the disc D is withdrawn from the storage section 3. At the same time, the second gear mechanism 17 of the moving mechanism 9 is horizontally aligned with the disc tray 2 through the hole 5a1 in the side wall 5a.

The plunger solenoid 25 is energized to bring the drive gear 17a into mesh with the rack 26 of the disc tray 2, and the motor 23 is energized to cause the drive gear 17a and the rack 26 to draw the disc tray 2 into the withdrawal section 4.

The disc tray 2 is withdrawn into the withdrawal section 4 until the support tongues 2a, 2b thereof are supported on the respective support ridges 8a, 8b. Then, while the upper and lower links 38a, 38b of the chuck link mechanism 38 are being extended, the elevator 12 is lowered to insert the upper and lower links 38a, 38b into the central hole d in the disc D and also to lower the disc base 34 into abutment against the upper surface of the disc D.

The upper and lower links 38a, 38b are collapsed by the end face cam 32, thereby clamping the disc D between the disc base 34 and the upper and lower links 38a, 38b. At this time, the disc D is lifted off the disc tray 2 by the collapsed upper and lower links 38a, 38b. Then, the second gear mechanism 17 is reversed in its rotation to move the disc tray 2, from which the disc D has been removed, backwards into the storage section 3 through the meshing engagement between the drive gear 17a and the rack 26.

After the empty disc tray 2 is placed in the storage section 3, the elevator 12 is lowered with the chuck mechanism 10 facing downwardly, i.e., holding the disc D as it hangs therefrom, to move the disc D toward the tray 61a of the reproducing device 61 which has been withdrawn into the lower portion of the withdrawal section 4. Then, the chuck link mechanism 38 is actuated to release the disc D, with the reverse side down, onto the tray 61a. The tray 61a is then pulled into the reproducing device 61, in which the reverse side of the disc D is played back.

After the disc D has been played back, the disc D is pushed out of the reproducing device 61, picked up from the tray 61a and clamped again by the chuck mechanism 10. The elevator 12 is lifted, and the disc D is returned onto the empty disc tray 2, after which the disc D and the disc tray 2 are stored in the storage section 3.

Whether or not the disc D is clamped by the chuck mechanism 10 is detected by a detecting switch 42 (see FIGS. 8 and 9), which is turned on when the disc D is clamped and turned off when the disc D is not clamped. When the disc D is not clamped by the chuck mechanism 10, the signal from the detecting switch 42 is applied to repeat collapsing and extending operation of the upper and lower links 38a, 38b.

As described above, the upper and lower links 38a, 38b of the chuck link mechanism 38 have certain lengths and are pantographically collapsible and extensible vertically to clamp the disc D. Therefore, the chuck link mechanism 38 can clamp a disc D which may be positioned at a spaced interval from the disc base 34, and hence may be of low mechanical accuracy and may be designed and manufactured with a wider range of flexibility. Furthermore, the chuck link mechanism 38 offers operational advantages in that it can clamp a disc D off the upper surface of the disc tray 2, allowing the empty disc tray 2 to return into the storage section 3 without need for lifting or lowering movement of the elevator 12.

In the above arrangement, the angle attachment 12b of the elevator 12 is detachably fastened to the inner side of the bearing member 46. When the elevator 12 is to be serviced or adjusted, the elevator 12 is vertically moved to a certain vertical position, and turned outwardly together with the bearing member 46 to expose the region of the angle attachment 12b where it is fastened to the bearing member 46 by the screws 46, for removal of the elevator 12. When the bearing member 46 is turned, the engaging projection 52 of the bearing member 46 is engaged by the upper and lower edges of the recess 53 defined in the reinforcing member 54. Therefore, even when the counterweight 13 is no longer counterbalanced by the bearing member 46 upon detachment of the elevator 12 from the bearing member 46, the counterweight 13 is prevented from falling and any danger which would otherwise be incurred by the falling counterweight 13 is avoided.

As described above, the chuck link mechanism 38 is capable of chucking a disc D from a position spaced from the disc D as the disc D is clamped between the disc base 34 and the upper and lower links 38a, 38b that are inserted in the central hole d in the disc D. Therefore, in the case where the chuck link mechanism 38 is incorporated in an automatic disc changer for a disc player, the mechanical accuracy of the chuck link mechanism 38 may not be very high. The chuck link mechanism 38 can be designed with flexibility, manufactured with ease, and operate highly reliably.

Since a disc D is clamped by the links 38a, 38b which are collapsed and extended through the central hole 2d therein, the disc D can be clamped from either one of its opposite sides, i.e., its upper side or its lower side. Consequently, the present invention is particularly advantageous when embodied in an automatic disc changer for a disc player for playing back double-sided discs, i.e., discs having recording surfaces on the opposite sides.

Although a certain preferred embodiment has been shown and described, it should be understood that many changes and modifications may be made therein without departing from the scope of the appended claims.

I claim as my invention:

1. A disc chucking apparatus for clamping a disc having a central hole, comprising:
   a chassis;
   an arm member which is vertically movable and reversible with respect to the chassis;
   a disc base fixedly mounted on the arm member and having a central insert member for being inserted in the central hole of the disc and a disc support surface for abutting engagement with a peripheral edge of the central hole of the disc;
   a cam disposed in the arm member, the cam having a cam surface including lowermost and uppermost portions;
   a rod extending axially slidably through the central insert member of the disc base, the rod having a roller on an opposite end thereof, the roller being held in rolling contact with the cam surface, the rod being axially movable between a first position in which the presser assembly is collapsed and a second position in which the pressure assembly is extended, in response to rolling movement of the roller on the lowermost and uppermost portions of the cam surface; and
   a presser assembly operatively coupled between the disc base and an end of the rod, and collapsible and extensible in response to sliding movement of the rod;
   whereby when the arm member is vertically moved with the presser assembly extended, the central insert member and the presser assembly are inserted into the central hole of the disc, and thereafter when the presser assembly is collapsed in response to sliding movement of the rod caused by the cam, the disc is clamped between the presser assembly and the disc support surface.

2. A disc chucking apparatus according to claim 1, further including a spring acting between the disc base and the rod for normally urging the rod to bias the presser assembly into the second position.

3. A disc chucking apparatus according to claim 1, wherein the presser assembly comprises a pantographic link mechanism composed of first and second links operatively coupled to each other, the first link being operatively coupled to the rod and the second link being operatively coupled to the central insert member.

* * * * *